Inventor
George C. Johnson

United States Patent Office 3,823,000
Patented July 9, 1974

3,823,000
RECOVERY OF POTABLE WATER FROM SEA AND BRACKISH WATER BY SELECTIVE SOLVENT EXTRACTION
George C. Johnson, Hopewell Township, Mercer County, N.J., assignor to Mobil Oil Corporation
Continuation of abandoned application Ser. No. 882,068, Dec. 4, 1969. This application May 31, 1972, Ser. No. 258,172
Int. Cl. B01d 11/04; C01b 5/00
U.S. Cl. 210—22                     5 Claims

ABSTRACT OF THE DISCLOSURE

Potable water is recovered from sea water with removal of salt by contacting sea water with a particularly characterized primary solvent which results in two separate fractions. One fraction contains water, a major proportion of primary solvent and a minor proportion of said salt. The other fraction contains water, a major proportion of said salt and a minor proportion of the primary solvent. The primary solvent is recovered from each fraction by the use of a secondary solvent. Potable water and brine are the major products from this process.

This is a continuation of Ser. No. 882,068, filed Dec. 4, 1969, now abandoned.

BACKGROUND OF THE INVENTION

1. Field of the Invention

The invention relates to the removal of salt from sea water to produce potable water.

2. Description of the Prior Art

Recovery of potable water from sea water by solvent extraction has heretofore been known. For example, the use of 1-butanol to extract water from sea water is mentioned in U.S. 3,239,459. However, such process is limited by the fact that at atmospheric pressure the maximum amount of water in the water/1-butanol mixture is only 31 percent. This necessarily limits the amount of water recoverable from a given weight of a 1-butanol/water mixture in operation at atmospheric pressure, and such process using 1-butanol suffers in comparison with a process where more than 31 percent water is present in the solvent/water mixture.

Another solvent desalting process heretofore known is one employing aliphatic amines as the extracting media. However, this process suffers from the fact that the process is carried out in a basic environment and therefore precipitates magnesium hydroxide, by reason of the presence of magnesium salts found in the sea water. Too, the amines form quaternary ammonium ions which accumulate in the discarded brine and lead either to excessively costly loss of the amines or to necessarily expensive recovery of solvent.

It has also been known to recover water from sea water by distillation. Such process has the inherent disadvantage in that the heat requirements are much greater than in processes that not only use solvents characterized by lower heats of vaporization than water, but also require vaporization of a smaller amount of liquid. The higher temperature of the distillation processes also increases the difficulties caused by precipitating calcium sulfate contained in the water undergoing treatment.

Other suggested desalination processes, such as reverse osmosis and electrodialysis are expensive when used with sea water and hence are less practical for treatment of large quantities of sea water.

SUMMARY OF THE INVENTION

In brief, this invention contemplates contacting sea water with a primary solvent which:

(1) has a critical solution temperature with water at least 33° C. greater than the temperature of the sea water undergoing contact and not more than 3° C. above the boiling point of the lowest boiling component or azeotrope in the primary solvent/water mixture;

(2) contains at least 25 percent more water in a mixture thereof with water at 3° C. below the critical solution temperature than at 40° C. below that temperature and;

(3) is characterized by substantial insolubility of salts in sea water in a mixture thereof and water, for a period of time which results in two separate fractions. One fraction contains water, a major proportion of primary solvent and a minor proportion of salt. The other fraction contains water, a major proportion of salt and a minor proportion of the primary solvent. The primary solvent is recovered from each fraction by contacting each with a secondary solvent which:

(1) is capable of substantially extracting primary solvent from a mixture thereof with water and,
(2) is substantially insoluble in water.

Potable water and brine are the major products from the process. "Critical solution temperature" is a known term which is defined as the minimum temperature for the mixing of two substances in all proportions as liquid (A. W. Francis, "Critical Solution Temperatures," Advances in Chemistry Series No. 31, American Chemical Society, Washington, 1961, page 1).

It is thus one of the principal objectives of this invention to provide a method for removing salt from sea water which increases the yield of pure water that can be obtained utilizing a technique which does not precipitate metal compounds and which employs solvents that have much lower heats of vaporization than water.

Brief Description of the Drawings

Certain preferred and illustrative embodiments of the invention are shown in the attached drawings wherein.

Description of Specific Embodiments

This process is designed for sea water that has a relatively uniform salt content. Sea water averages about 3.5 weight percent salt, but this figure will vary according to location. Fjords or protected bays that are fed by high volumes of fresh water will contain less than the average salt content, while warm shallow seas, such as the Red Sea, contain more than the average salt content. Potable water is considered as water containing less than .05 weight percent salt. The present process is effective for treatment of water that contains between .05 and 6.5 weight percent salt. For sea water, the salt content generally does not exceed about 4 weight percent. The major component of this salt is sodium chloride but sea water also contains smaller proportions of various other salts resulting, for example, from the combination of magnesium, calcium, potassium and sodium cations with chloride, sulfate and carbonate anions. In addition to sea water, the present process may be used in treatment of other naturally occurring or industrial process waters containing metal compounds including salts and hydroxides. Also, it is contemplated that the present process may be used in the concentration or recovery of such metal compounds. Accordingly, it will be understood that whereas the process will be hereafter particularly described with reference to treatment of sea water, it is applicable to treatment of other salt or metal compound-containing waters. Representative of the latter are brackish waters from inland lakes and from wells.

The process described herein represents a marked advance in the art of desalination. Thus, the present process has clear-cut advantages over previously considered methods and provides a highly feasible, economic and effective means for tapping the billions of gallons of sea water as a source of drinkable water. The extraction process of this invention is rendered economically attractive by a combined unique contacting and solvent recovery system.

Figure 1:
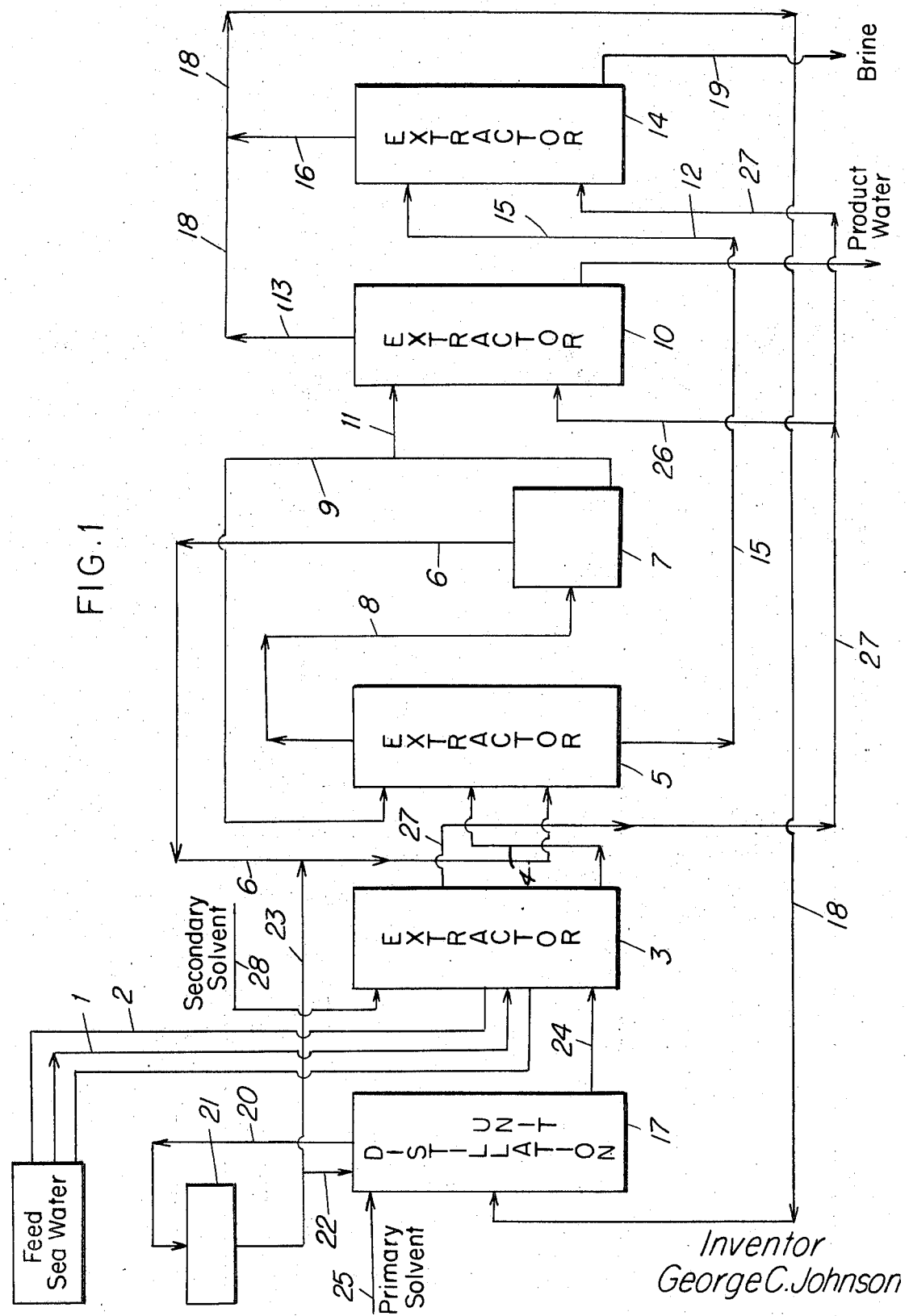
FIG. 1 is a flow sheet illustrating the sequence of steps in the described process.

Referring now particularly to FIG. 1, sea water is heated during passage through conduit (1) by heat exchange with a hotter medium contained within jacket (2) and led into extractor (3). The heated sea water passes from the lower portion of extractor 3 through pipe 4 and into a second extractor 5. Here the sea water is extracted countercurrently in multiple stages with primary solvent which enters extractor 5 through pipe 6 from phase separator 7. The upper stream from extractor 5 contains purified water and primary solvent. This stream is directed through conduit 8 into phase separator 7. After cooling during passage through conduit 8, two layers are formed in separator 7. The upper layer, rich in primary solvent, is returned via pipe 6 into extractor 5. The lower layer in separator 7, rich in purified water and containing primary solvent, is removed through conduit 9; one portion supplies purified water reflux to extractor 5 through conduit 9. The other portion is directed into extractor 10 through pipe 11. The primary solvent is removed from the purified water in extractor 10 by countercurrent multiple stage extraction with a secondary solvent, introduced into extractor 10 via conduit 26. The product desalted water is removed through pipe 12. This product water contains not more than 500 p.p.m. salt, 3 p.p.m. primary solvent and 1 p.p.m. secondary solvent dissolved in the water. Such minute amount of secondary solvent can be removed from the product water, if desired, by displacement with a liquid paraffin. This displacement solvent is removed by aeration or pressure release. Suitable liquid paraffins for such purpose include lower boiling hydrocarbons such as liquid ethane, liquid propane, liquid butane, pentanes or hexanes. The upper stream withdrawn from extractor 10 contains primary solvent and secondary solvent. This stream is led from extractor 10 through pipe 13 into conduit 18.

The lower stream from extractor 5 is fed into extractor 14 through pipe 15 where it is contacted with the secondary solvent introduced into extractor 14 via conduit 27. The upper mixture in extractor 14 contains primary solvent and secondary solvent. A stream of such mixture is withdrawn overhead from extractor 14 through pipe 16 and led into conduit 18 where it joins the overhead from extractor 10. The combined streams are led through conduit 18 to distillation unit 17. The lower stream from extractor 14 is product brine and contains not more than 3 p.p.m. primary solvent and 1 p.p.m. secondary solvent dissolved in the brine. The latter typically contains from about 6 to 10 percent by weight salt. Such stream is withdrawn through pipe 19. The mixture of primary and secondary solvent is distilled in unit 17.

The primary solvent, when having the lower boiling point, is recovered as overhead through pipe 20 and led into a condenser 21. Liquid primary solvent reflux is returned to distillation unit 17 through conduit 22. Primary solvent is recycled into extractor 5 through pipes 23 and 6. The secondary solvent is formed as a liquid bottoms in the distillation unit 17. The secondary solvent from the lower portion of unit 17 is then fed into extractor 3 via pipe 24 where traces of primary solvent are removed therefrom by extraction with the sea water feed via conduit 1. Secondary solvent from extractor 3 is fed to extractor 14 via pipe 27. Make-up primary solvent, as needed, is introduced in distillation unit 17 through conduit 25 and make-up secondary solvent, as needed, is introduced in extractor 3 via conduit 28.

Sea water temperature varies from −2° C. to +32° C. This inlet sea water temperature will determine the operating temperature in separator 7 shown in FIG. 1. The temperature in separator 7 should be higher than the temperature of the inlet sea water as the sea water is used as the final coolant, by indirect heat exchange, for the feed to separator 7. This difference should be at least 3° C. and preferably more than 5° C. to minimize the area of heat exchange used to cool the material in conduit 8. There should be at least about a 30° C. difference but generally not more than about 40° C. difference between extractor 5 and separator 7 for the process to be most effective. Hence extractor 5 should operate at least 33° C. above the inlet sea water temperature and, at the same time, below the lowest boiling point of any component of the primary solvent or water. Only a relatively few critical solvents and solvent combinations meet these criteria.

Figure 2:
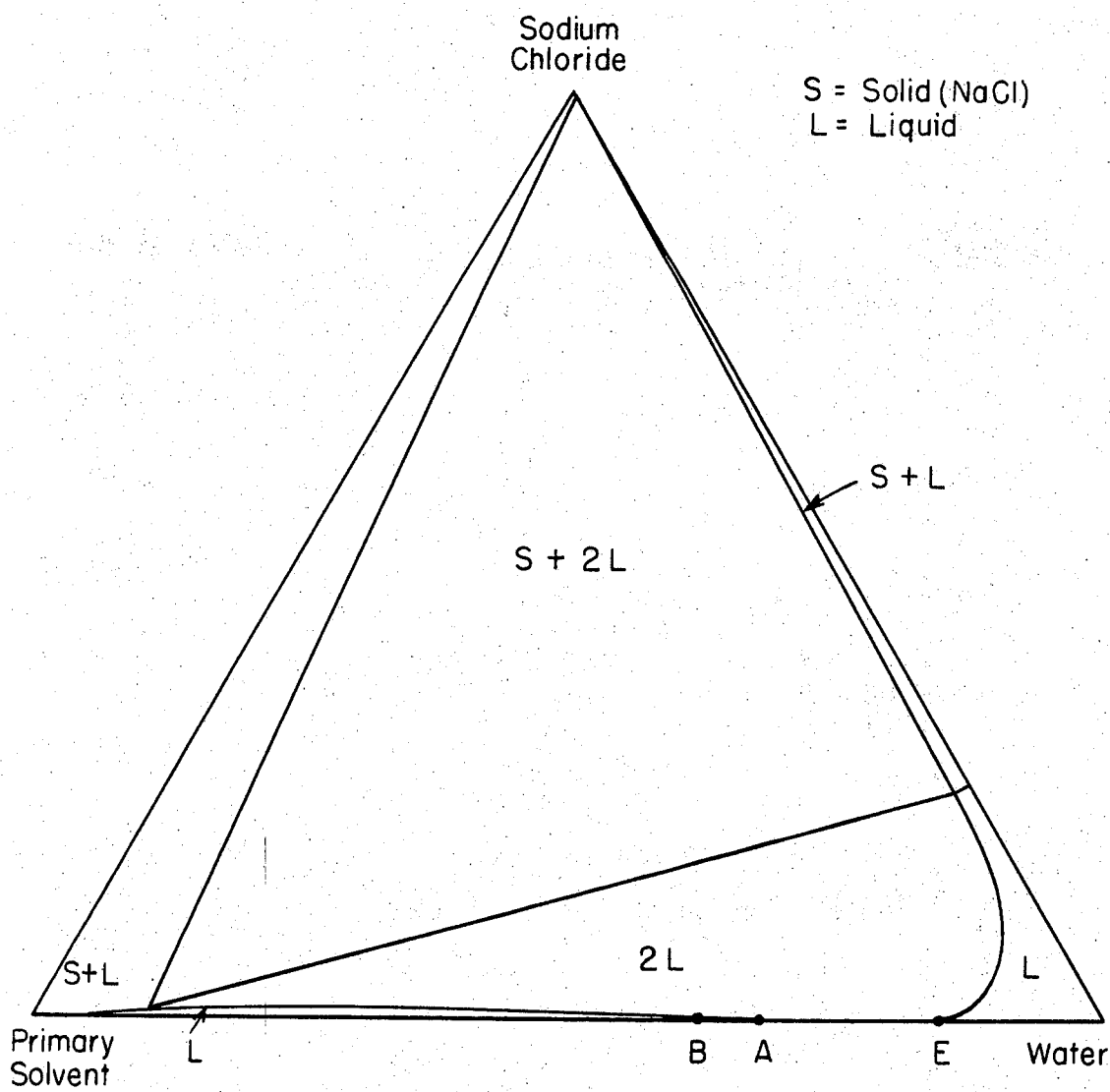
FIG. 2. is a typical phase diagram depicting a representative solvent-water-salt system, wherein the solvent is a mixture of 1-butanol and 1-propanol.

The primary solvent should dissolve a substantial quantity of water and yet be immiscible in water at the operating temperature at the top of extractor 5. Reference to FIG. 2 will illustrate this requirement. Point A in FIG. 2 represents material that contains primary solvent and water but not salt. Point E also represents material free from salt. Point B in FIG. 2 represents material that contains primary solvent, water and less than 500 parts of salt per million parts of water. This value of 500 p.p.m. salt is the current U.S. Public Health Service limit for an acceptable level of salt in potable water. The method of this invention is capable of producing water below this limit for the salt level in potable water. The interval between A and E in FIG. 2 is herein referred to as a "miscibility gap." This miscibility gap is necessary in order to provide the possibility of preparing salt free water. Experimentally, point A is approached but not reached. The composition of the upper stream from extractor 5 is represented by a point coincident with or to the right of point B in FIG. 2.

The efficacy of this process will depend on the percent water in the primary solvent/water mixture produced in extractor 5 and flowing through conduit 8 and can be measured by a so-called "figure of merit," which is defined as the pounds of water produced for each pound of the stream from the top of extractor 5. The figures of merit can be used to compare the effectiveness of primary solvents. High values for the figure of merit are preferred. The upper limiting value is 1.00. The quantity of water produced is the quantity of water in the lower stream of separator 7, identified as BL7. U5 is the quantity of material passing through conduit 8. BL7/U5 is the fraction, i.e. the figure of merit, one wishes to maximize. This fraction, after appropriate mathematical substitutions, becomes equal to $$\frac{(FBU5-FBU7) \times FBL7}{(FBL7-FBU7)}$$

where FBU5=wt. fraction water in U5; FBU7=wt. fraction water in U7, which is the quantity of material passing through pipe 6; and FBL7=wt. fraction water in L7, which is the quantity of material passing through conduit 9.

Some mixtures of solvents produce higher figures of merit than the individual solvents. In a particularly preferred embodiment of this invention a mixture of 1-butanol and 1-propanol is employed. This mixture is generally characterized by a figure of merit above 0.40. The most desirable composition of the mixed solvent is 35–40 percent of 1-propanol and 60–65 percent 1-butanol. Inasmuch as 1-propanol and water form an azeotrope which boils at 87° C. at atmospheric pressure, extractor 5 has an operating temperature limitation of 87° C. Mixtures of 1-butanol and 1-propanol having critical solution temperatures with water between 70 and 90 C. contain about 80 percent water at the critical solution temperature. At the plait point about 67 percent water is present. The plait point composition is the limitation composition approached by the two phases in equilibrium. The preferred temperature range at the top of extractor 5 is 1 to 4° C. below the temperature corresponding to the plait point composition in the 1-propanol/1-butanol/water system. With this temperature differential, the two layers have enough difference in density to separate readily by gravity.

Other solvents that may be used as components of the above mixed primary solvent include partial or complete replacement of 1-butanol by cyclopentanone; 2-butanol; methyl acetate; propionitrile; 4-methyl; 1,3-dioxane; isobutyl alcohol; or 2-butanone. Solvents which may partially or completely replace 1-propanol in the above mixture include methanol; ethanol; 2-propanol; tertiarybutyl alcohol; acetone; 2-methoxyethanol; 2-ethoxyethanol; 1-methoxy-2-propanol; 3-methoxy-1-propanol; 2-methoxy-1-propanol; 3-ethoxy-1-propanol; 2-i-propoxyethanol; 1,2-dimethoxyethane; 1,1-diethoxyethane; methoxyethoxyethane; 1,3-dioxane; 1,4-dioxane; 2-methyl-1,4-dioxane; 1,3-dioxolane; 2-methyl-1,3-dioxolane; acetonitrile; propionaldehdye; or methyl formate. The primary solvent need not be limited to two components. Three typical examples of primary solvent with more than two components are: (a) 1-butanol/isobutyl alcohol/1-propanol (b) 1-butanol/1-propanol/2-propanol (c) 1-butanol/isobutyl alcohol/1-propanol/2-propanol.

Few single primary solvents can be used in this process. Those that can be employed have deficiencies in relation to the preferred mixed solvents. Single solvents include phenol; glutaronitrile; methyl formate; 4,6-dimethyl-1,2-pyrone; 2,4-pentanedione; acrolein; p-nitrophenol; isovaleric acid; m-nitrophenol; adiponitrile; and nitromethane.

Preferred primary solvents are less dense than water. However, as an alternative, the primary solvent may have a density greater than water. A requirement of a primary solvent that has a density greater than water is that between 40 and 60 percent water be miscible in said primary solvent before the densities of the solvent and aqueous phases become the same. An example of such a suitable solvent is nitromethane, which has a density of 1.14 at 25° C.

A secondary solvent is used to recover the primary solvent from both fractions that are formed. This secondary solvent should have a very low solubility in water and must be capable of extracting the primary solvent from a mixture with water. Secondary solvents include $C_9$ and $C_{10}$ alkyl benzenes, $C_9$ and $C_{10}$ paraffinic and cycloparaffinic compounds. Typical examples are the methyl propyl benzenes, the butyl benzenes, normal nonane, methyl octanes, dimethyl heptanes, normal decane, methyl nonanes, dimethyl octanes, isopropylcyclohexane, n-propyl cyclohexane, methyl ethyl cyclohexanes, butyl cyclopentane, methyl propyl cyclopentanes, and diethylcyclopentanes and their mixtures, particularly fractions from petroleum and from hydro-cracked petroleum. In a particularly preferred embodiment of this invention, normal decane is used as the secondary solvent. In another preferred embodiment of this invention, A $C_9$–$C_{10}$ paraffinic/cyclo- paraffinic mixture derived from hydrocracked petroleum is used as the secondary solvent.

Various and numerous alternatives exist in the operation of the system depicted in FIG. 1. Thus, part of the upper outlet stream from separator 7, passing through pipe 6, which is rich in primary solvent, may be heated and then added to sea water effluent from extractor 3 passing through conduit 4 before said effluent enters extractor 5. This procedure serves to saturate the sea water effluent with primary solvent and results in direct heat exchange between the heated primary solvent and cold or partly warmed sea water effluent. This alternative is preferred when the primary solvent has a higher boiling point than the secondary solvent.

As a further alternative, the secondary solvent may have a lower boiling point than the primary solvent. When such type secondary solvent is used, the overhead product from distillation unit 17 would consist mostly of secondary solvent. The lower product in distillation unit 17 now consists mainly of primary solvent. The lower product is conducted to extractor 5 as primary solvent and the upper product is sent to extractor 3. This variation, while useful under some circumstances is generally not preferred since there is usually more secondary than primary solvent present in the distillation unit 17. Heat requirements depend on the multiplied product of the amount vaporized and the heat of vaporization, hence, allowing for the heat of vaporization, heat requirements are usually lower if the minor component is vaporized instead of the major component. Low boiling secondary solvents include benzene, n-pentane, cyclopentane, neohexane, n-hexane, methyl cyclopentane, cyclohexane, mixed hexanes, mixed pentanes and hexanes, $C_5$–$C_6$ fractions from petroleum, from alkylates or derived from naphtha by hydrocracking or from hydrogenated dimers.

When extractors 10, 14, and distillation unit 17 are operated under pressure, this permits certain low-boiling solvents which cannot be condensed at atmospheric pressure with sea water as a coolant or are difficult to condense to be used as secondary solvents. These additional secondary solvents include isopentane, n-butane, i-butane, propane, mixtures of the aforesaid with each other and mixtures of the aforesaid with n-pentane. Such solvents have the advantage of vaporizing at low temperatures. Heat for vaporizing them can be supplied at lower temperatures than other solvents. Further, these solvents can be removed readily from the product water by aeration.

Figure 3:
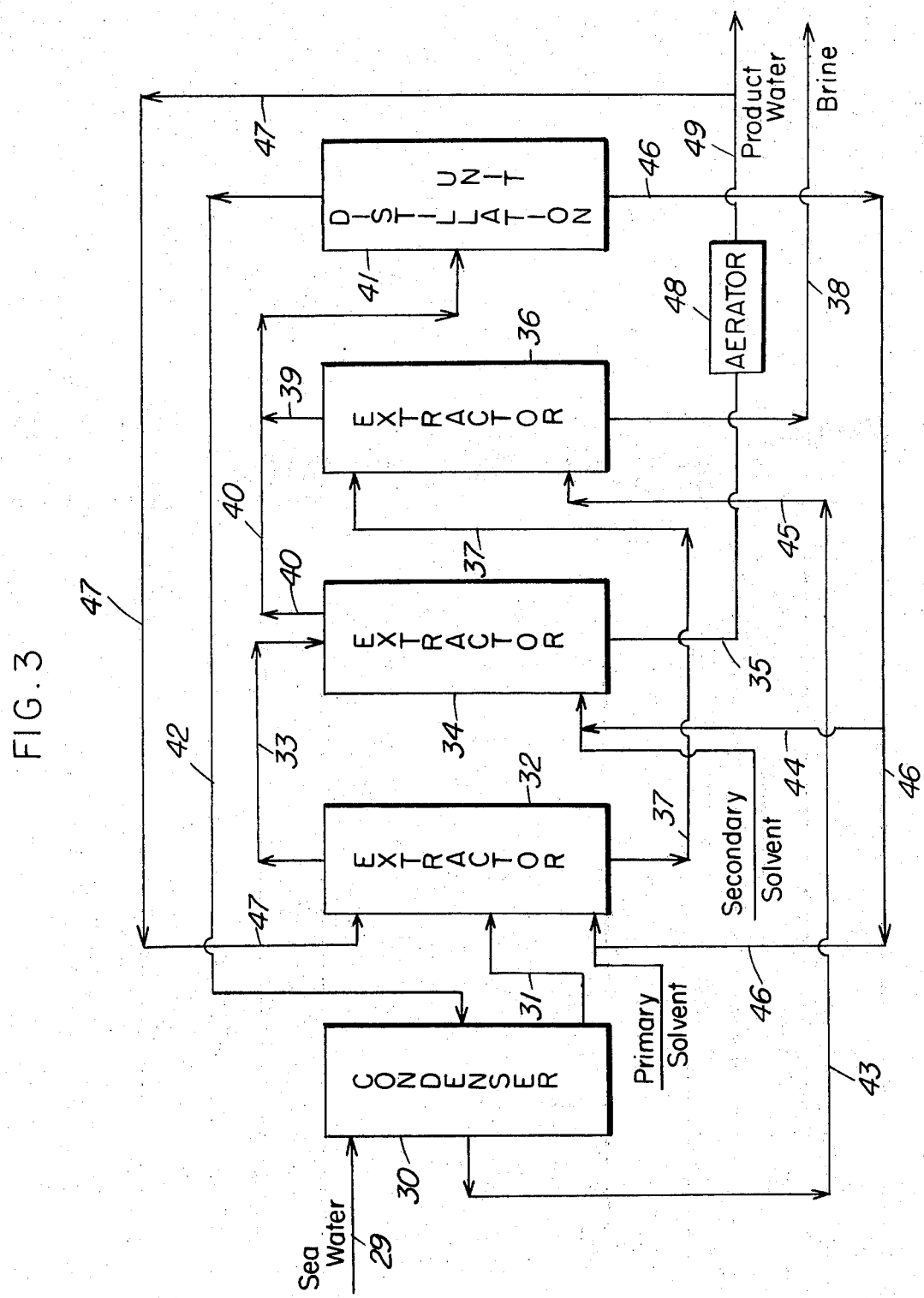
FIG. 3 is a flow diagram illustrating the sequence of steps in a process where all the primary solvent is recovered by extraction.

All of the primary solvent can be recovered by extraction with the secondary solvent without cooling of the upper layer from extractor 5 in FIG. 1. FIG. 3, using a low boiling secondary solvent, illustrates this modification in simplified form without depicting heat exchangers. Sea water introduced via pipe 29 is initially used to condense secondary solvent vapors in condenser 30. The source of the secondary solvent will be identified later. The sea water passing from the bottom of column 30 is fed into extractor 32 via pipe 31. Extraction is carried out in extractor 32 countercurrently in multiple stages with primary solvent introduced into the lower portion thereof via conduit 46. Product water may be recycled via conduit 47 to the top of extractor 32 to minimie the amount of salt dissolved in the upper stream from extractor 32. This stream which contains primary solvent, water and a very minor propertion of salt is fed into extractor 34 via pipe 33 where it is contacted with secondary solvent. The upper stream from extractor 34 contains primary and secondary solvent. The lower stream contains product water and a trace of secondary solvent. This lower stream is removed through conduit 35 and passed through aerator 48 to remove the secondary solvent. Product water is removed from the system via outlet pipe 49. The lower layer from extractor 32 containing the major proportion of the salt, water, and a minor proportion of the primary solvent, is fed into extractor 36 through pipe 37. This lower layer from extractor 32 is contacted in extractor 36 with the secondary solvent introduced via conduit 45. The lower layer from extractor 36 contains brine and is discharged via pipe 38. The upper stream from extractor 36, containing primary and secondary solvent, is withdrawn through pipe 39 and combined with the upper stream from extractor 34 in conduit 40 and fed into distillation unit 41. The lower boiling secondary solvent is distilled over and the vapor is fed into condenser 30 via pipe 42 where it is condensed by direct contact with the incoming sea water. The secondary solvent is then returned via conduits 43, 44, 45 to extractors 34 and 36 respectively for use as previously described. The bottoms in distillation unit 41 is primary solvent and is returned to extractor 32 via conduit 46. This alternate method has the advantage of eliminating the large heat exchanger in separator 7 in FIG. 1 and minimizing the heat required during distillation due to the lower heat of vaporization of the secondary solvent.

As a further alternative of the system shown in FIG. 1 extractor 5 may be operated at an elevated pressure. The use of pressure allows operation closer to the critical solution temperature with solvents that have lower boiling points at atmospheric pressure. Operating under pressure usually serves to increase the figure of merit. At the critical solution temperature, a solvent will contain the greatest percentage of water. At temperatures not far below the critical solution temperatures, the percentage of water will remain high. Typical examples of solvents that become available when extractor 5 is operated under pressure are 1-butanol and isobutyl alcohol. When operating under increased pressure with accompanying increase in temperature, there is the disadvantage of increasing possibility of precipitation of calcium sulfate. Separator 7 and extractor 14 may be operated under elevated pressure and this embodiment is particularly desirable if extractors 3 and 5 are likewise under pressure.

As still a further alternative of the system shown in FIG. 1, extractors 5, 10 and 14 can be operated with a temperature gradient across one or more of these extractors. In extractor 5, the portion of the extractor from the bottom to feed inlet, pipe 4, can be operated at a higher temperature than the portion from such feed inlet to the top of this extractor. This technique produces internal refluxing of the aqueous phase and the salt content of the solvent phase will be reduced. The need for external reflux, through pipe 9, is thereby diminished. However, as the temperature of the lower portion is increased care must be taken not to precipitate calcium sulfate since this salt becomes less soluble in water as the temperature is increased.

Extractor 5 can also be operated with the lower portion having a lower temperature than the top portion. This technique further reduces the possibility of precipitation of calcium sulfate but increases the need for refluxing agent through pipe 9. Extractor 14 can be operated with a higher temperature at the top than the bottom. This would reduce the heat exchange requirements for the lower stream from extractor 5 entering via pipe 15 and for the upper stream from extractor 14 leaving via pipe 16. However, using such technique a brine product would be produced having a higher temperature. This would either require heat exchange or a loss of heat when the brine is discarded.

Extractor 10 can also be operated with a higher temperature at the top. This technique is advantageous if separator 7 is operated at a higher temperature then the incoming secondary solvent. Such would eliminate the need for cooling the stream containing primary solvent and water entering extractor 10 via pipe 11.

As a further alternative, separator 7 can be operated in two sections at different temperatures and compositions. For example, the lower stream from one section can be used as the feed to extractor 10 while the lower stream from the other section can be recycled to extractor 5 as reflux. The upper stream from the warmer section may be conducted to the cooler section and thereafter returned to extractor 5 for use as the extracting solvent. This alternative reduces greatly the heat exchange surface needed to cool the upper stream from extractor 5 before it enters separator 7.

Figure 4:
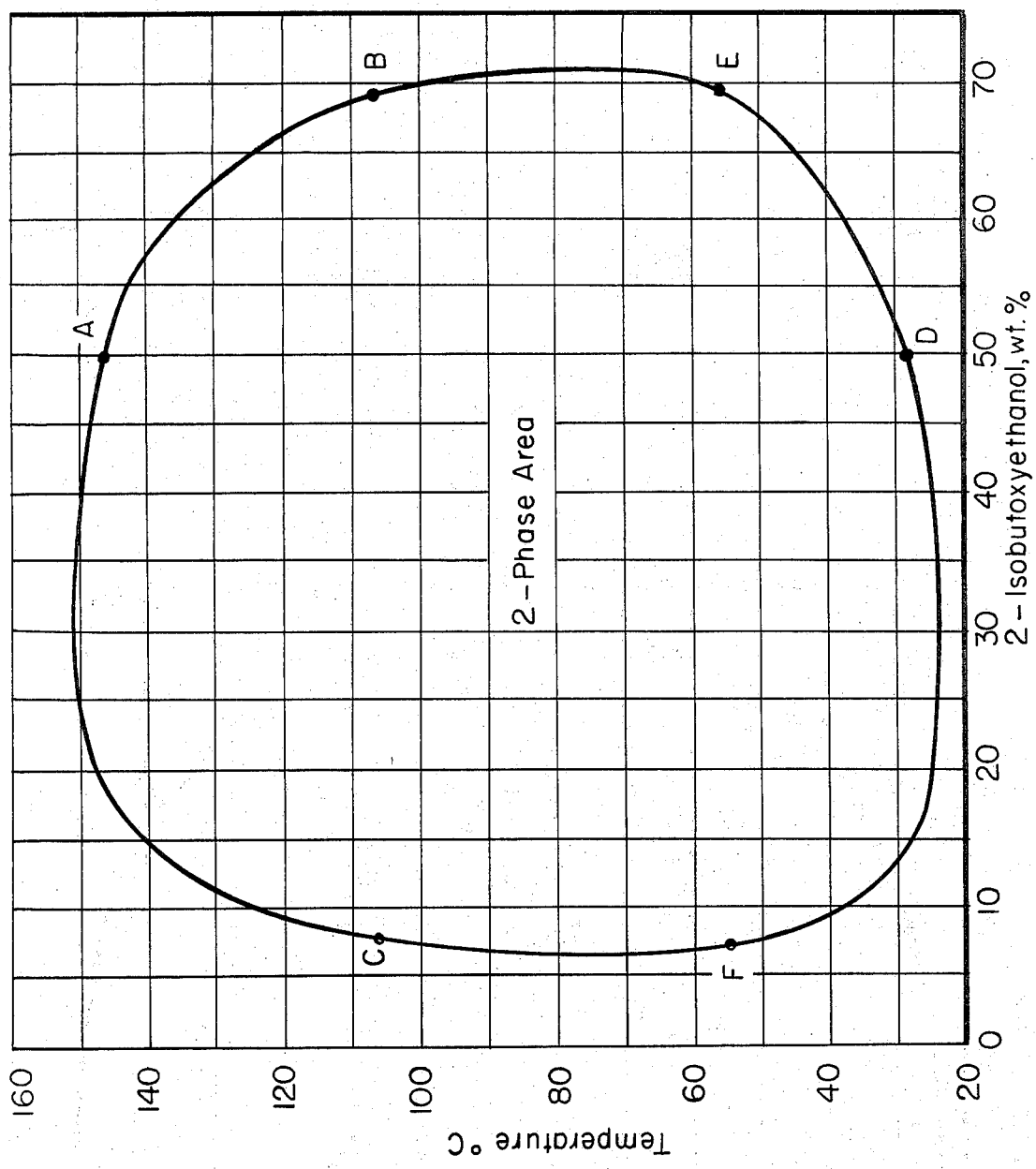
FIG. 4 is a typical phase diagram depicting a representative solvent-water system, wherein the solvent is 2-isobutoxyethanol.

In another alternative embodiment, it is possible to heat, rather than cool, the upper stream from extractor 5 to form two phases in separator 7. A substantially different temperature range is needed in extractor 5. Not all solvents can be used under both the described heating and cooling alternatives. FIG. 4 illustrates the requird solubility relationship a solvent must have with water in order for this modification to be feasible. Thus, it is possible to operate extractor 5 at the temperature and composition marked by Point D in FIG. 4 showing a water/2-isobutoxyethanol system, the latter being the primary solvent. In this Figure, the weight percentage of 2-isobutoxyethanol is plotted against temperature. If this liquid is now warmed it will produce two liquid phases having the compositions designated respectively E and F. It is also possible to operate extractor 5 at a temperature and composition marked by Point A in FIG. 4 and cool this liquid to produce two phases with the compositions designated respectively by B and C.

In still another alternative embodiment, particularly in those instances where water of very low salt content is available, such as water from some wells or from rain water, this water may be introduced into extractor 5 as the source of the water reflux stream. Using such alternative, all of the material passing from the bottom of separator 7 can be fed through conduit 9 and pipe 11 directly to extractor 10.

Figure 5:
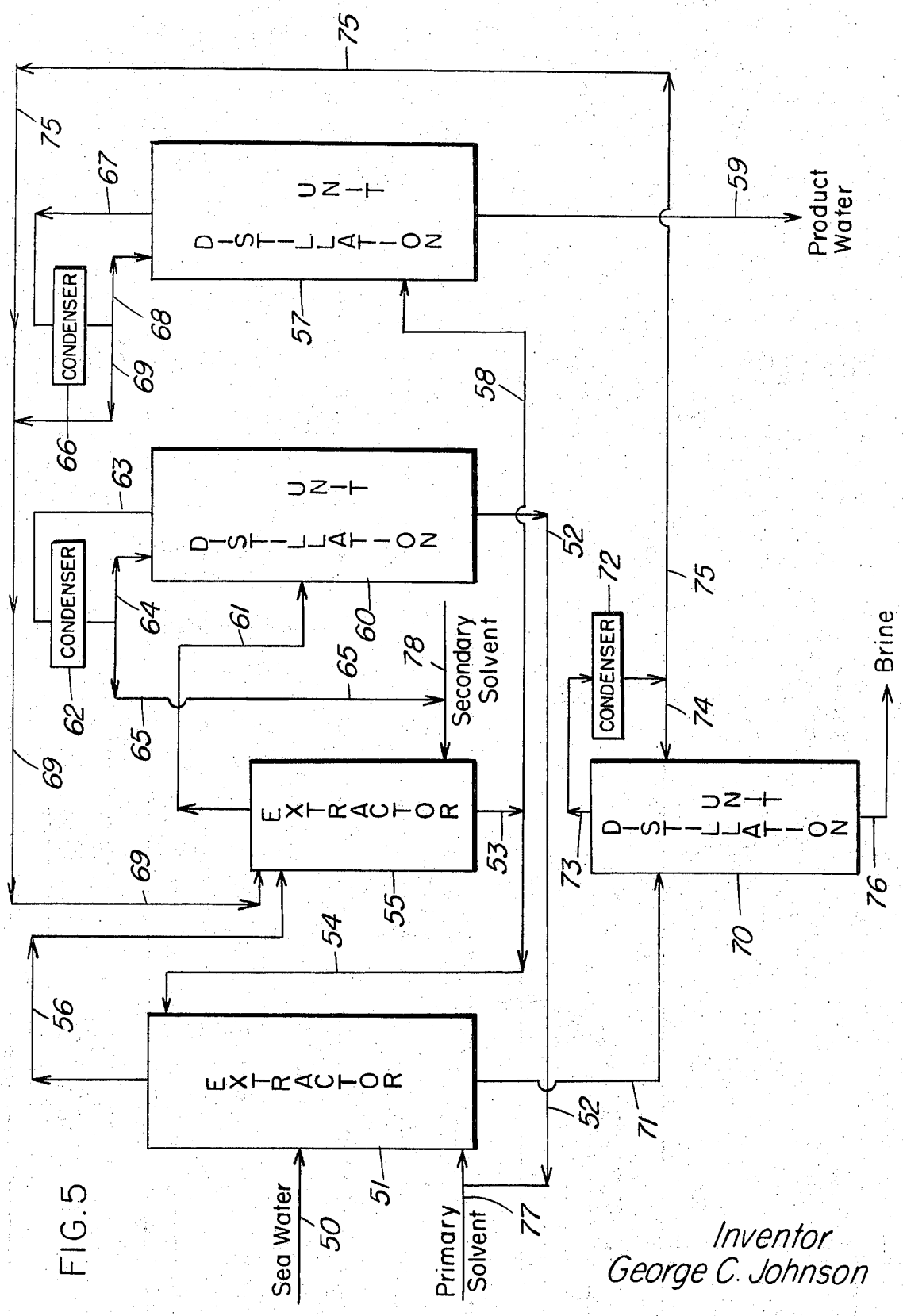
FIG. 5 is a flow diagram depicting an alternate system wherein the secondary solvent employed has a boiling point lower than the primary solvent and wherein the latter solvent is recovered by extraction and distillation.

As a further alternative, the secondary solvent may have a lower boiling point than the primary solvent, the primary solvent may be recovered by extraction and distillation. The extraction units can be operated at a temperature not exceeding either the boiling point of any of the solvent components present or the critical solution temperature of water with the primary solvent. The primary solvent remaining in the product water and brine can be recovered from each by distillation. FIG. 5 illustrates this modification. Sea water which has been warmed is fed into extractor 51 via pipe 50 where it is extracted countercurrently with a stream of primary solvent which enters extractor 51 via pipes 77 and 52. A solvent layer and a water layer are formed in extractor 51. The solvent layer, which is the upper layer is extracted by a recycled stream which is rich in water and enters extractor 51 via pipes 53 and 54. The upper layer from extractor 51, which contains water, primary solvent and a minor proportion of salt is fed into extractor 55 via pipe 56. This product is then extracted with a secondary solvent which enters extractor 55 via pipes 78 and 65. Extractor 55 has only a limited amount of equilibrium stages and accordingly the extractioa of primary solvent is not complete. This procedure allows for the use of a small amount of secondary solvent. A preferable range would be one part by weight of secondary solvent to 5 to 20 parts by weight of the upper stream from extractor 51.

The lower product from extractor 55 withdrawn through pipe 53, contains water, primary solvent, and a small amount of secondary solvent. This stream is divided, one part is returned to extractor 51, via pipe 54 for use as previously described. The other portion is sent to distillation unit 57 through pipe 58. Water and the primary solvent are distilled off in unit 57 as an azeotrope. In addition a small amount of secondary solvent is distilled off leaving the bottoms product as the desired desalinated water. The product water is recovered through pipe 59.

The upper product from extractor 55 contains mostly secondary and primary solvents. This mixture is fed into distillation unit 60 via pipe 61. During distillation, the secondary solvent passes overhead as the major product and primary solvent is retained as the major bottoms product. The primary solvent is recovered from the bottom of unit 60 and recycled via pipe 52 to extractor 51 as previously discussed. The overhead product from unit 60 is fed into condensor 62 via pipe 63 and a portion of the condensed product is returned to distillation unit 60 as a refluxing agent via pipe 64. The remainder of the condensed product is returned to extractor 55 via pipe 65.

The upper stream from distillation unit 57 which contains primary solvent, water and a small proportion of secondary solvent is fed into condensor 66 via pipe 67 and a portion of such condensed product is returned as reflux to distillation unit 57 via pipe 68. The other portion of this condensed product is returned to extractor 55 via pipe 69.

The lower layer from extractor 51, which contains water, salt and a minor proportion of the primary solvent is fed into distillation unit 70 via pipe 71. The primary solvent with some water, passes overhead in unit 70 and is fed into condensor 72 via pipe 73 and a portion of this condensed product is returned to distillation unit 70 via pipe 74. The remainder of the condensed product from condenser 72 passes through conduit 75 joining the overhead product from distillation unit 57. The combined stream passing to extractor 55 as previously described. The bottoms product from distillation unit 70 is brine and is removed through pipe 76.

Operating extractors 51 and 55 at approximately the same elevated temperature eliminates the necessity for cooling the material in line 56 and for heating the material in line 54. In addition, the relative simplicity of extractor 55 reduces the volume of secondary solvent that is required.

Suitable secondary solvents for use in the above system of FIG. 5 are n-hexane, cyclohexane, cyclopentane, methyl cyclopentane, branched hexanes, n-pentane, benzene, and C$_6$ fractions from petroleum or hydrocracked naphthas. Suitable primary solvents for this system are those described hereinabove. The product water obtained in accordance with the solvent extraction process described herein may, if desired, undergo further conventional finishing operations. Thus, the product water may be subjected to aeration, charcoal treatment, filtration, ultraviolet radiation, addition of additives and other known treatments.

It will be understood that the foregoing description is merely illustrative of the methods of the invention, of which many variations may be made by those skilled in the art within the scope of the following claims without departing from the spirit thereof.

What is claimed is:

1. A method of recovering potable water from a feed water selected from the group consisting of sea water and brackish water which comprises the steps of
   (a) contacting said feed water, at a temperature at least 33° C. above the initial feed water temperature prior to said contact with a normally liquid primary solvent consisting of a mixture of 60–65 volume percent 1-butanol and 35–40 volume percent propanol, said solvent mixture
      (1) being completely miscible in water at all proportions at a minimum temperature which is at least 33° C. greater than the said initial temperature of the feed water and not more than 3° C. above the boiling point of the lowest boiling component in the resulting solvent/water mixture;
      (2) containing at least 25% more water in the said resulting solvent/water mixture at 3° C. below the minimum temperature of (1) than at 40° C. below the said minimum temperature;
      (3) characterized by substantial insolubility of the salts normally found in the feed water in the resulting solvent/water mixture;
   (b) thereby forming two separate immiscible fractions consisting of: (i) water, a major proportion of said primary solvent and a minor proportion, not more than 500 p.p.m. by weight of the water component alone, of said metal compound and (ii) water, a minor proportion of said primary solvent and a major proportion of said metal compound;
   (c) separating said fractions;
   (d) reducing the temperature of fraction (i) to at least 3° C. above the initial temperature of the said feed water;
   (e) contacting fraction (i) with a secondary solvent which is both capable of extracting said primary solvent and substantially insoluble in water and has a higher boiling point than the primary solvent mixture, said secondary solvent being selected from the group consisting of alkyl benzenes and paraffinic and cycloparaffinic compounds containing from 9 to 10 carbon atoms; and
   (f) separating the mixture of primary and secondary solvents from the product of step (e) leaving a potable water product.

2. The method of claim 1 wherein a minor portion of 1-butanol in the primary solvent is replaced by a solvent selected from the group consisting of cyclopentanone, 2-butanol, methylacetate, proprionitrile, isobutyl alcohol and 2-butanone.

3. The method of claim 1 wherein a minor portion of 1-propanol in the primary solvent is replaced by a solvent selected from the group consisting of methanol, ethanol, 2-propanol, tertiarybutyl alcohol, acetone, 2-methoxyethanol, 2-ethoxy ethanol, 1-methoxy-2-propanol, 3-methoxy-1-propanol, 2-methoxy-1-propanol, 3-ethoxy-1-propanol, 2-isopropoxyethanol, 1,4-dioxane, acetonitrile, propionaldehyde and methyl formate, 4. A method according to claim 1 in which the secondary solvent is decane.

5. The method of claim 1 wherein the contacting of fraction (i) with a secondary solvent in step (e) is carried out countercurrently in multiple extraction stages.

References Cited

UNITED STATES PATENTS

| | | | |
|---|---|---|---|
| 3,415,746 | 12/1968 | Buetow | 23—312 W |
| 3,415,744 | 12/1968 | Buetow | 23—312 W |
| 3,239,459 | 3/1966 | Patterson | 23—312 W |
| 3,350,298 | 10/1967 | Carr | 23—312 W |
| 3,395,098 | 7/1968 | Hess | 23—312 W |
| 3,373,105 | 3/1968 | Guptill | 23—312 W |
| 2,967,825 | 1/1961 | Baniel | 23—312 W |

FOREIGN PATENTS

| | | | |
|---|---|---|---|
| 295,488 | 11/1966 | Australia | 23—312 W |

OTHER REFERENCES

Desalination By Liquid-Liquid Extraction, Howell et al., October 1954, pp. 3 to 17.

Desalination By Liquid-Liquid Extraction, SWD19, Oct. 3–9, 1965, Beckmann et al., pp. 1 to 10.

NORMAN YUDKOFF, Primary Examiner

S. J. EMERY, Assistant Examiner

U.S. Cl. X.R.

423—580